United States Patent
Endo et al.

(10) Patent No.: US 8,138,893 B2
(45) Date of Patent: Mar. 20, 2012

(54) SEMICONDUCTOR INTEGRATED CIRCUIT DEVICE

(75) Inventors: Takefumi Endo, Tokyo (JP); Takayuki Tsukamoto, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 997 days.

(21) Appl. No.: 12/057,671

(22) Filed: Mar. 28, 2008

(65) Prior Publication Data
US 2008/0238632 A1 Oct. 2, 2008

(30) Foreign Application Priority Data
Mar. 30, 2007 (JP) ................... 2007-091614

(51) Int. Cl.
*H04Q 5/22* (2006.01)
(52) U.S. Cl. ............ 340/10.5; 340/10.1; 340/572.1; 340/572.3
(58) Field of Classification Search ........... 340/10.1, 340/10.5, 572.1, 572.3; 342/44, 51; 235/492
See application file for complete search history.

(56) References Cited

U.S. PATENT DOCUMENTS

| | | | | |
|---|---|---|---|---|
| 5,945,920 A | * | 8/1999 | Maletsky | 340/10.52 |
| 6,685,096 B1 | * | 2/2004 | Degrauwe et al. | 235/492 |
| 2001/0028302 A1 | * | 10/2001 | Degrauwe et al. | 340/10.5 |
| 2005/0040885 A1 | | 2/2005 | Hayashi | |
| 2006/0145851 A1 | | 7/2006 | Posamentier | |
| 2006/0186989 A1 | * | 8/2006 | Chon et al. | 340/5.61 |

FOREIGN PATENT DOCUMENTS

| | | |
|---|---|---|
| CN | 1584927 A | 2/2005 |
| JP | 2006-185234 | 7/2006 |
| WO | 2006/091585 A2 | 8/2006 |

\* cited by examiner

*Primary Examiner* — Edwin Holloway, III
(74) *Attorney, Agent, or Firm* — Mattingly & Malur, PC (57) ABSTRACT

In an IC tag, when a semiconductor integrated circuit device is activated, an operation control unit sets existence/nonexistence of a communication distance limitation for reducing a communication distance to a state management unit. If the communication distance limitation is not set, a switch unit is turned ON and a demodulated command is inputted from a command demodulation circuit to a command decode unit. If the communication distance limitation is set, a power intensity monitor unit judges whether the power of a rectification circuit is greater than or equal to a predetermined arbitrary field intensity. If the power is less than the predetermined arbitrary field intensity, the switch unit is turned OFF and various commands demodulated by the command demodulation circuit are not inputted to the command decode unit. As a result, the semiconductor integrated circuit device does not operate.

8 Claims, 5 Drawing Sheets

SEMICONDUCTOR INTEGRATED CIRCUIT DEVICE

CROSS-REFERENCE TO RELATED APPLICATION

The present application claims priority from Japanese Patent Application No. JP 2007-091614 filed on Mar. 30, 2007, the content of which is hereby incorporated by reference into this application.

TECHNICAL FIELD OF THE INVENTION

The present invention relates to an RFID (Radio Frequency IDentification) system, and in particular to a technique effective for improvement of security in an ID tag.

BACKGROUND OF THE INVENTION

As an automatic recognition technique enabling data transmission through radio communication, RFID is spreading. For example, the RFID comprises an ID tag capable of storing information, a reader/writer performing reading and writing of information in the ID tag and a host performing management of the information read by the reader/writer and the like.

Unique ID information is allocated to each ID tag, and therefore, in commodity distribution and the like, by attaching the ID tag to a commercial product and distributing the same, traceability of each commercial product can be performed efficiently.

However, in the RFID, since read/write of data is performed in a non-contacting manner, such a problem with security may occur that when a person holds an ID tag, behavior of the person is traced by a third party without his/her knowledge.

As a technique for preventing acquisition of information in the ID tag by a third party, for example, such a technique is known that a communication distance of the ID tag is reduced by shifting impedance matching between an antenna and a rectification circuit generating a power source voltage of the ID tag, increasing a consumption current in the rectification circuit consciously or the like.

As a technique of communication distance reduction of the ID tag of this kind, for example, a technique changing a communication response setting value by command data from an external communication device, changing an inside parameter corresponding to the same influencing a communication response distance and changing the communication response distance according to the parameter (see Japanese Patent Application Laid-Open Publication No. 2006-185234 (Patent Document 1)), a technique reducing a communication response distance by connecting a resistor or the like between an antenna and a reference potential VSS to shift impedance matching (see United States Patent Application Publication No. 2006/0145851 (Patent Document 2)) and the like exist.

SUMMARY OF THE INVENTION

However, in the abovementioned techniques of communication response distance reduction utilizing the RFID, the following problems are found by the inventors.

Usually, a setting for reducing the communication distance is updated using information previously set in a memory or the like from a host in a power-up sequence of the ID tag. However, power source efficiency lowers just after the update, and at this time, if input power is not large sufficiently, the ID tag is powered-off.

However, the ID tag is charged again just after the power-off of the ID tag, and a predetermined power-up sequence is repeated. In this case, although communication distance limitation is realized, the ID tag repeats ON/OFF as far as the ID tag is irradiated with a radio wave.

Generally, since impedance of a semiconductor device varies depending on existence/nonexistence of bias, magnitude of a reflection wave from the ID tag is fluctuated because of the repetition of ON/OFF, and therefore, there is a concern that operation as if noise is back-scattered may occur.

An object of the present invention is to provide a technique capable of limiting a communication distance in the ID tag while realizing stable communication without lowering communication efficiency.

The above and other objects and novel characteristics of the present invention will be apparent from the description of this specification and the accompanying drawings.

The typical ones of the inventions disclosed in this application will be briefly described as follows.

The present invention provides a semiconductor integrated circuit device used in an IC tag converting a radio wave received from a reader/writer to power and returning information to the reader/writer comprising: a rectification circuit receiving the radio wave outputted from the reader/writer, rectifying power caused by electromagnetic induction of the radio wave and generating a primary voltage; a voltage stabilization circuit stabilizing the primary voltage generated by the rectification circuit and generating an internal power source voltage; a command demodulation circuit demodulating a command added to the radio wave outputted from the reader/writer to a digital signal; a command decode unit decoding the command of the digital signal demodulated by the command demodulation circuit; and a communication distance limitation control circuit limiting a communication distance with the reader/writer, wherein the communication distance limitation control circuit performs control permitting no acceptance of the digital signal outputted from the command demodulation circuit when communication distance limitation setting data setting limitation of the communication distance with the reader/writer is set.

And, the present invention provides the semiconductor integrated circuit device in which the communication distance limitation control circuit comprises: a communication distance setting unit storing information about whether the communication distance limitation setting data setting the limitation of the communication distance with the reader/writer is set; a power intensity monitor unit monitoring power of the primary voltage generated by the rectification circuit and making judgment whether the power of the primary voltage is a predetermined arbitrary field intensity or more; and a communication distance limitation circuit performing control so that the command decode unit has no input of the digital signal outputted from the command demodulation circuit by making connection between the command demodulation circuit and the command decode unit nonconductive when the communication distance limitation setting data setting the limitation of the communication distance is set in the communication distance setting unit and the power intensity monitor unit makes a judgment that the power of the primary voltage is smaller than the predetermined arbitrary field intensity.

Furthermore, the present invention provides the semiconductor integrated circuit device in which the communication distance limitation control circuit comprises: a communication distance setting unit storing information about whether the communication distance limitation setting data setting the limitation of the communication distance with the reader/ writer is set; a power intensity monitor unit monitoring power of the primary voltage generated by the rectification circuit and making a judgment whether the power of the primary voltage is a predetermined arbitrary field intensity or more; and a communication distance limitation circuit shutting off the radio wave from the reader/writer inputted to the command demodulation circuit when the communication distance limitation setting data setting the limitation of the communication distance is set in the communication distance setting unit and the power intensity monitor unit makes a judgment that the power of the primary voltage is smaller than the predetermined arbitrary field intensity.

And, in the present invention, the power intensity monitor unit monitors the power of the primary voltage using a clamp current clamped when the voltage stabilization circuit generates the internal power source voltage.

Furthermore, in the present invention, the power intensity monitor unit performs comparison between a clamp voltage obtained by converting a clamp current to a voltage and a comparison voltage and outputs a result of the comparison as a judgment result.

And, an outline of another aspect of the present application will be described as follows.

The invention provides a semiconductor integrated circuit device including a rectification circuit connected to an external antenna, a command demodulation circuit and a back scatter circuit, comprising: a voltage stabilization circuit stabilizing a voltage of the rectification circuit and supplying power; a power intensity monitor unit detecting field intensity from an output voltage of the voltage stabilization circuit; and a logic circuit receiving a signal from the command demodulation circuit, performing an operation and outputting a result of the operation to the back scatter circuit, wherein the logic circuit comprises a state management unit making a judgment whether a current state is ordinary communication or under distance limitation, and wherein the logic circuit cuts off a signal path from the command demodulation circuit to a command decode unit when the state management unit makes a judgment that the current state is under the distance limitation and the field intensity detected by the power intensity monitor unit is smaller than predetermined arbitrary field intensity.

And, in the invention, the logic circuit further comprises a communication distance limitation control circuit including a communication distance limitation circuit performing control so that the command decode unit has no input of a digital signal outputted from the command demodulation circuit by making a connection between the command demodulation circuit and the command decode unit nonconductive when the state management unit makes a judgment that the current state is under the distance limitation and the field intensity detected by the power intensity monitor unit is smaller than the predetermined arbitrary field intensity.

Furthermore, in the invention, the power intensity monitor unit monitors power of a primary voltage generated by the rectification circuit and makes a judgment whether the power of the primary voltage is the predetermined arbitrary field intensity or more.

And, in the invention, the power intensity monitor unit monitors the power of the primary voltage using a clamp current clamped when the voltage stabilization circuit generates an internal power source voltage.

Furthermore, in the invention, the power intensity monitor unit performs a comparison between a clamp voltage obtained by converting a clamp current to a voltage and a comparison voltage and outputs a result of the comparison as a judgment result.

The effects obtained by typical aspects of the present invention will be briefly described below.

(1) Since communication distance limitation is performed while monitoring a clamp current, the communication distance limitation can be performed at stable operation without lowering communication efficiency.

(2) And, since input of a command is limited when the communication distance limitation is set, it is possible to prevent repetition of ON/OFF of a semiconductor integrated circuit device and noise scattering can be prevented.

(3) According to the above (1) and (2), an RFID system with high reliability can be realized.

DESCRIPTIONS OF THE PREFERRED EMBODIMENTS

Hereinafter, embodiments of the present invention will be described in detail with reference to the accompanying drawings. Note that the components are denoted by the same reference symbols throughout the drawings for describing the embodiments, and the repetitive description thereof will be omitted.

First Embodiment

Figure 1:
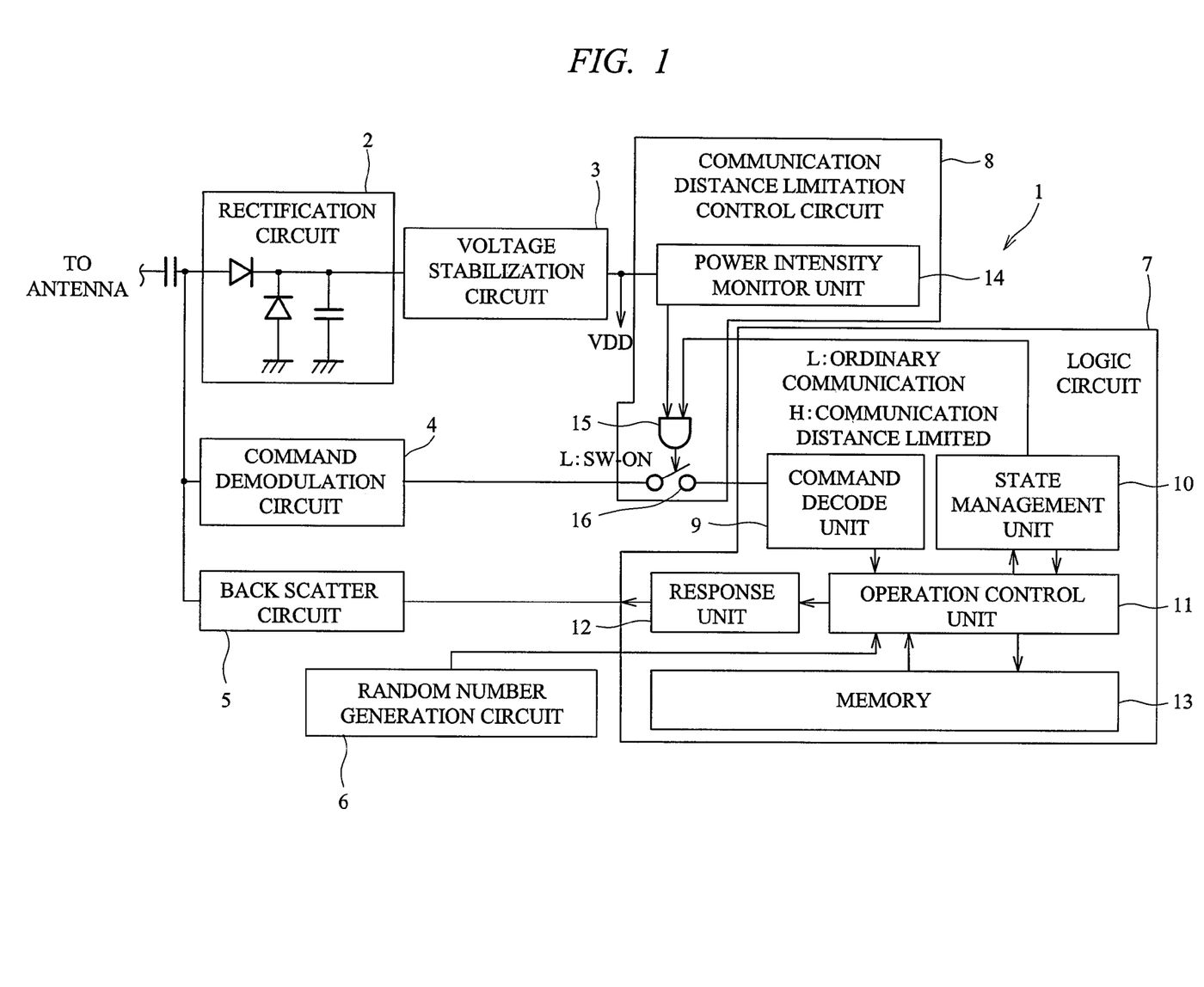
FIG. 1 is a block diagram of a semiconductor integrated circuit device according to a first embodiment of the present invention.
Figure 2:
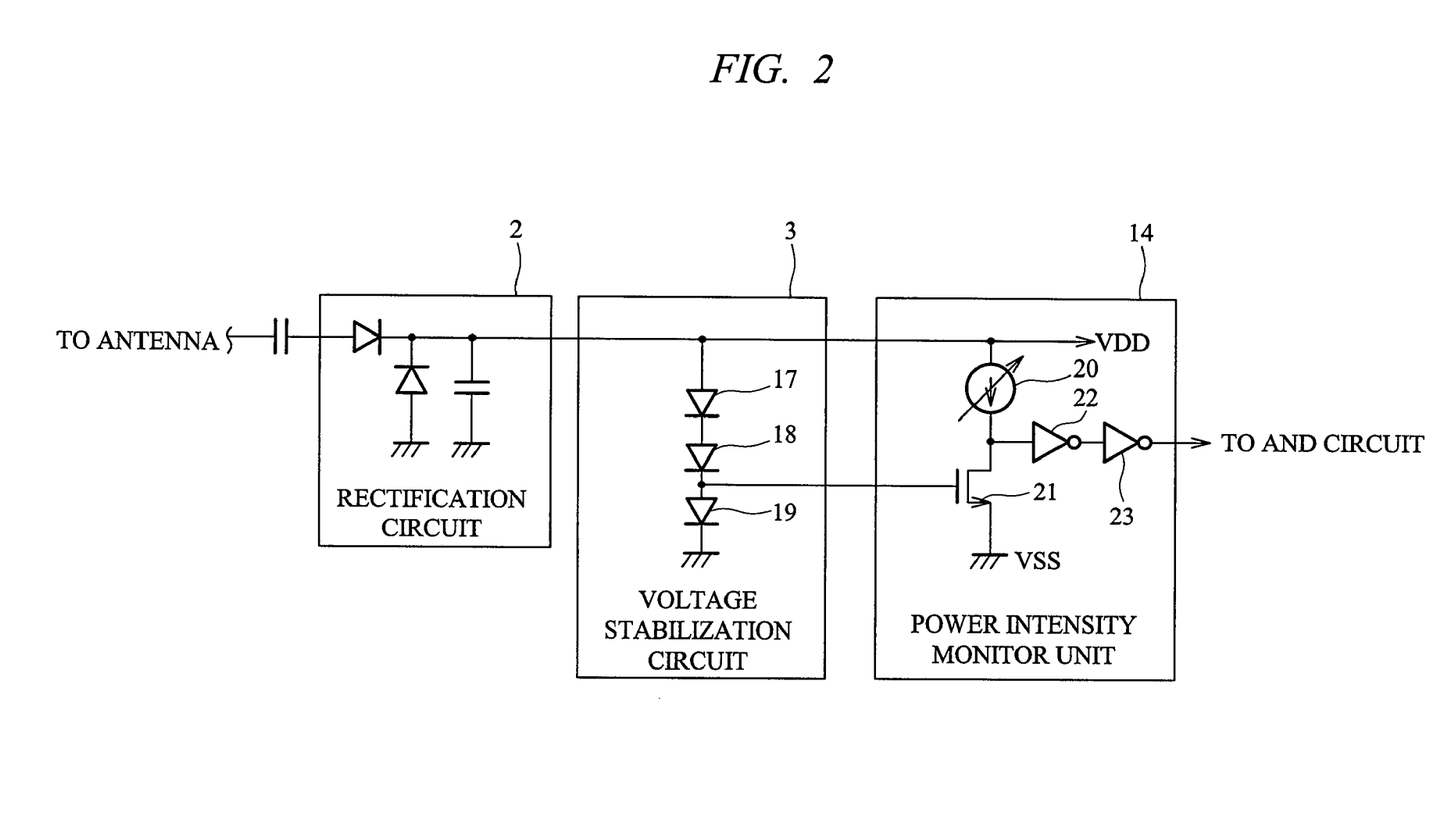
FIG. 2 is an explanatory diagram showing a configuration example of a voltage stabilization circuit and a power intensity monitor unit provided in the semiconductor integrated circuit device shown in FIG. 1.
Figure 3:
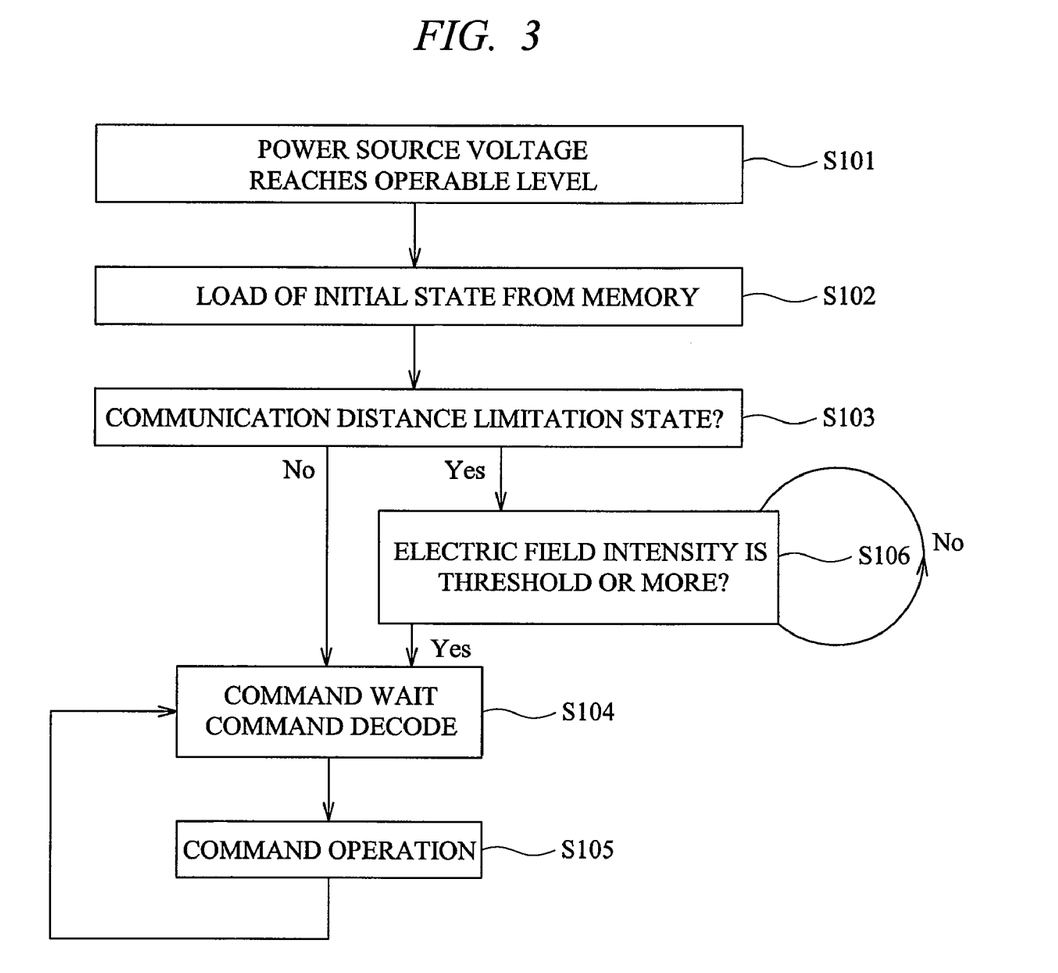
FIG. 3 is a flowchart showing one example of operation of a communication distance limitation control circuit provided in the semiconductor integrated circuit device shown in FIG. 1.

FIG. 1 is a block diagram of a semiconductor integrated circuit device according to a first embodiment of the present invention, FIG. 2 is an explanatory diagram showing a configuration example of a voltage stabilization circuit and a power intensity monitor unit provided in the semiconductor integrated circuit device shown in FIG. 1, and FIG. 3 is a flowchart showing one example of operation of a communication distance limitation control circuit provided in the semiconductor integrated circuit device shown in FIG. 1.

In the first embodiment, a semiconductor integrated circuit device 1 is used for, for example, an ID tag of an RFID system which is one of automatic recognition techniques. As shown in FIG. 1, the semiconductor integrated circuit device 1 comprises a rectification circuit 2, a voltage stabilization circuit 3, a command demodulation circuit 4, a back scatter circuit 5, a random number generation circuit 6, a logic circuit 7 and a communication distance limitation control circuit 8.

The rectification circuit 2 receives a radio wave outputted from a reader/writer performing reading and writing of information via an antenna connected to the semiconductor integrated circuit device, rectifies power due to electromagnetic induction thereof and outputs the same as a primary voltage VCC.

The voltage stabilization circuit 3 stabilizes the primary voltage VCC outputted from the rectification circuit 2 and supplies the same to the command demodulation circuit 4, the back scatter circuit 5, the random number generation circuit 6, the logic circuit 7 and the communication distance limitation control circuit 8 as an internal power source voltage VDD serving as operation power, respectively.

The command demodulation circuit 4 demodulates various commands and the like added to a carrier signal through, for example, ASK (Amplitude Shift Keying) modulation and transmitted from a reader/writer performing reading and writing of information, converts the same to digital signals and outputs the same to the logic circuit 7.

The back scatter circuit 5 modulates a reflection wave (back scatter) by changing antenna terminal impedance provided in the semiconductor integrated circuit device 1 according to data. The random number generation circuit 6 generates random numbers used for congestion control of the RFID and outputs the same to the logic circuit 7.

The logic circuit 7 comprises a command decode unit 9, a state management unit 10, an operation control unit 11, a response unit 12 and a memory 13. The command decode unit 9 decodes a command demodulated by the command demodulation circuit 4 and outputs the same to the operation control unit 11.

The state management unit 10 serving as a communication distance setting unit is composed of, for example, a register, and setting data about the existence/nonexistence of communication distance limitation for communication with the reader/writer is set by the operation control unit 11. The setting data is set by the reader/writer. The operation control unit 11 conducts operation control of reading/writing of information of the memory 13 based on the command outputted from the command decode unit 9 and performs the reading/writing of information.

The response unit 12 receives the existence/nonexistence of a response, a response type and an instruction of a response parameter from the operation control unit 11 and operates the back scatter circuit 5 according to a transmission speed of response data.

The memory 13 is composed of a non-volatile semiconductor memory such as an EEPROM (Electronically Erasable and Programmable Read Only Memory) and the like, for example, and stores various information from the reader/writer.

The communication distance limitation control circuit 8 comprises a power intensity monitor unit 14, an AND circuit 15 and a switch unit 16.

The power intensity monitor unit 14 monitors power of the primary voltage VCC, judges whether the power is a predetermined arbitrary field intensity or more and outputs the judgment result as a control signal.

One of input portions of the AND circuit 15 configuring a communication distance limitation circuit is connected so that the judgment result of the power intensity monitor unit 14 is inputted, and the other of the input portions of the AND circuit 15 is connected so that a register value of the setting data of the communication limitation of the state management unit 10 is inputted.

To an output portion of the AND circuit 15, a control terminal of the switch unit 16 configuring the communication distance limitation circuit is connected. One of connection portions of the switch unit 16 is connected with an output portion of the command demodulation circuit 4, and the other of the connection portions of the switch unit 16 is connected with an input portion of the command decode unit 9.

The switch unit 16 is turned ON (conductive) when a signal outputted from the AND circuit 15 is a Lo signal, and is turned OFF (non-conductive) when the signal outputted from the AND circuit 15 is a Hi signal, for example.

FIG. 2 is an explanatory diagram showing a configuration example of the voltage stabilization circuit 3 and the power intensity monitor unit 14.

The voltage stabilization circuit 3 is composed of diodes 17 to 19, and the power intensity monitor unit 14 is composed of a constant current source 20, a transistor 21 and inverters 22, 23.

To an anode of the diode 17, an output portion of the rectification circuit 2 is connected, and to a cathode of the diode 17, an anode of the diode 18 is connected. To a cathode of the diode 18, an anode of the diode 19 is connected, and to a cathode of the diode 19, a reference potential VSS is connected.

The primary voltage VCC outputted from the rectification circuit 2 is clamped and stabilized by the serially connected diodes 17 to 19 configuring the voltage stabilization circuit 3, and an internal power source voltage VDD is outputted.

And, in the power intensity monitor unit 14, the transistor 21 is composed of, for example, an N-channel MOS (Metal Oxide Semiconductor).

To one of the connection portions of the transistor 21, the constant current source 20 is connected, and to the other of the connection portions of the transistor 21, the reference potential VSS is connected. To a transistor gate, a connection portion between the serially connected diode 18 and diode 19 is connected.

To the one of the connection portions of the transistor 21, an input portion of the inverter 22 is connected, and to an output portion of the inverter 22, an input portion of the inverter 23 is connected. A signal outputted from the inverter 23 is a judgment result of the power intensity monitor unit 14 and is connected so as to be inputted to the one of input portions of the AND circuit 15.

Next, operation of the communication distance limitation control circuit 8 according to the present embodiment is explained with reference to a flowchart shown in FIG. 3.

First, when the semiconductor integrated circuit device 1 approaches the reader/writer and the internal power source voltage VDD from the voltage stabilization circuit 3 reaches an operable voltage level (step S101), the operation control unit 11 reads an initial state of the semiconductor integrated circuit device 1 from the memory 13 (step S102).

At this time, the operation control unit 11 judges whether the communication distance limitation reducing a communication distance is set (step S103), and sets the existence/nonexistence of the communication distance limitation to the state management unit 10. For example, if the communication distance limitation is set, the operation control unit 11 sets '1' (Hi signal) to the state management unit 10, and if the communication distance limitation is not set, namely, in ordinary communication, the operation control unit 11 sets '0' (Lo signal) to the state management unit 10.

In the processing of the step S103, if the communication distance limitation is not set, a Lo signal set in the state management unit 10 is inputted to the other input portion of the AND circuit 15, and therefore, an output of the AND circuit 15 becomes a Lo signal regardless of a signal state of the judgment result of the power intensity monitor unit 14.

If the Lo signal is outputted from the AND circuit 15, the switch unit 16 is turned ON, and various commands and the like demodulated by the command demodulation circuit 4 are inputted to the command decode unit 9 (step S104), and the semiconductor integrated circuit device 1 performs a command operation (step S105).

Thereby, communication between the semiconductor integrated circuit device 1 and the reader/writer is performed without limitation of a communication distance.

On the other hand, in the processing of the step S103, if the communication distance limitation is set, the power intensity monitor unit 14 judges whether the power outputted from the rectification circuit 2 is a predetermined arbitrary field intensity or more (step S106), and outputs the determination result as a control signal.

If a distance between the semiconductor integrated circuit device 1 and the reader/writer is short and the power outputted from the rectification circuit 2 is the predetermined arbitrary field intensity or more, a voltage level of the primary voltage VCC outputted from the rectification circuit 2 also becomes high, and therefore, a voltage clamped by the voltage stabilization circuit 3 is increased.

With the above operation, the transistor 21 turns ON and the judgment result outputted from the inverter 23 becomes a Lo signal. If the judgment signal is a Lo signal, an output of the AND circuit 15 becomes a Lo signal, the switch unit 16 turns ON and the processings of the steps 104 and 105 are performed.

And, if the distance between the semiconductor integrated circuit device 1 and the reader/writer is long and the power outputted from the rectification circuit 2 is smaller than the predetermined arbitrary field intensity, the voltage level of the primary voltage VCC outputted from the rectification circuit 2 lowers along with this, and therefore, the voltage clamped by the voltage stabilization circuit 3 is decreased, the transistor 21 turns OFF and the judgment signal outputted from the inverter 23 becomes a Hi signal.

Note that, the predetermined arbitrary field intensity used in the judgment by the power intensity monitor unit 14 can be freely changed by changing a current value of the constant current source 20. This is because a threshold voltage value of the transistor 21 is changed by changing the current value of the constant current source 20.

If the judgment signal is a Hi signal, the output of the AND circuit 15 becomes a Hi signal so that the switch unit 16 turns OFF, and therefore, even if the command demodulation circuit 4 demodulates various commands and the like, the commands are not inputted to the command decode unit 9, as a result, the semiconductor integrated circuit device 1 does not operate.

As described above, if the communication distance limitation is set in the semiconductor integrated circuit device 1, the communication distance can be limited so that the semiconductor integrated circuit device 1 does not operate unless the semiconductor integrated circuit device 1 and the reader/writer approach each other up to an arbitrary distance.

And, even if the semiconductor integrated circuit device 1 operates under the communication distance limitation, operation of the semiconductor integrated circuit 1 can be stabilized.

Thereby, according to the present embodiment, since the communication distance limitation can be performed by monitoring of a clamp current of the voltage stabilization circuit 3 by the communication distance limitation control circuit 8, the communication distance limitation can be performed with stable operation without lowering communication efficiency.

Second Embodiment

Figure 4:
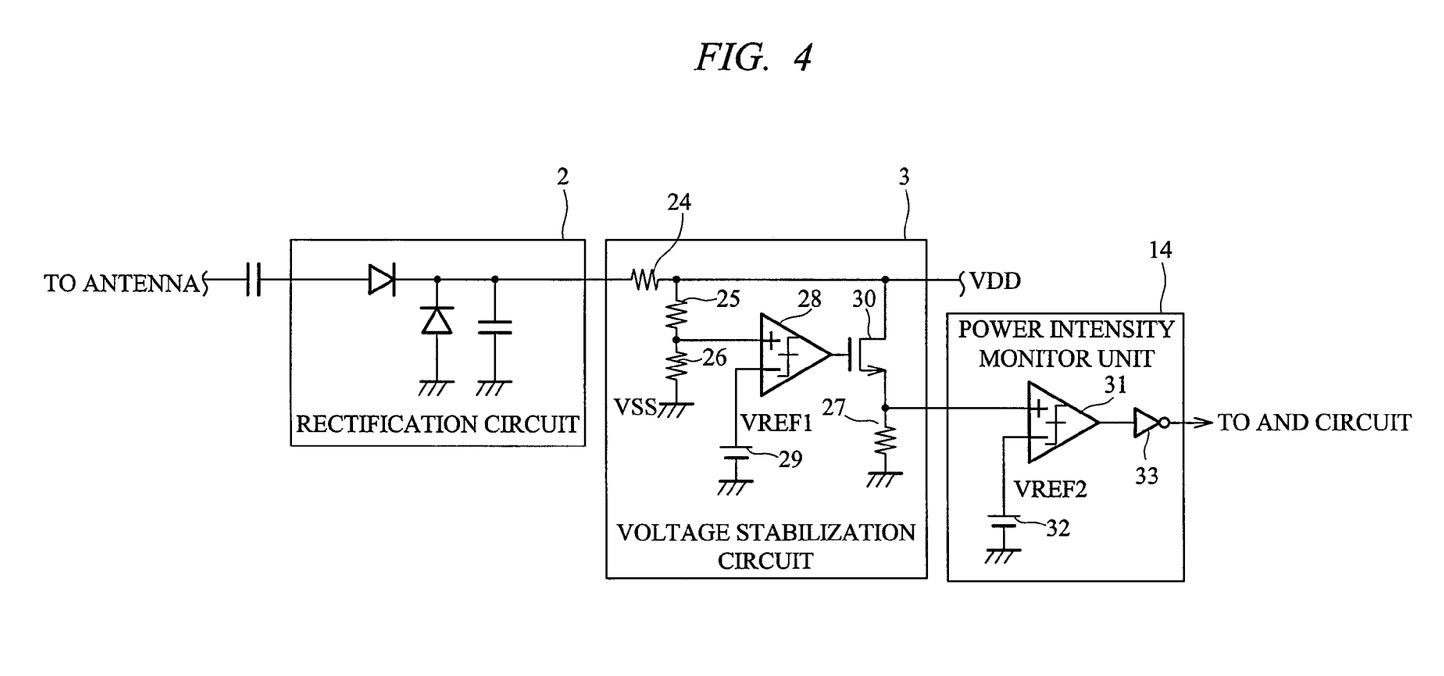
FIG. 4 is an explanatory diagram showing a configuration example of a voltage stabilization circuit and a power intensity monitor unit provided in a semiconductor integrated circuit device according to a second embodiment of the present invention.

FIG. 4 is an explanatory diagram showing a configuration example of a voltage stabilization circuit and a power intensity monitor unit provided in a semiconductor integrated circuit device according to a second embodiment of the present invention.

In the second embodiment, a semiconductor integrated circuit 1 (FIG. 1) comprises a rectification circuit 2, a voltage stabilization circuit 3, a command demodulation circuit 4, a back scatter circuit 5, a random number generation circuit 6, a logic circuit 7 and a communication distance limitation control circuit 8 in the same way as that of the first embodiment. The second embodiment is different from the first embodiment in the configurations of the voltage stabilization circuit 3 and the power intensity monitor unit 14.

FIG. 4 is a block diagram showing a configuration example of the voltage stabilization circuit 3 and the power intensity monitor unit 14.

The voltage stabilization circuit 3 comprises resistors 24 to 27, a comparator 28, a reference power source unit 29 and a transistor 30. And, the power intensity monitor unit 14 comprises a comparator 31, a reference power source unit 32 and an inverter 33.

To one of the connection portions of the resistor 24, an output portion of the rectification circuit 2 is connected, and to the other one of the connection portions of the resistor 24, one of connection portions of the resistor 25 is connected. And, an internal power source voltage VDD is outputted from the other one of the connection portions of the resistor 24.

To the other one of the connection portions of the resistor 25, one of connection portions of the resistor 26 and a positive (+) side input portion of the comparator 28 are connected. The reference power source unit 29 generates a reference voltage VREF1 to be a comparison voltage inputted to a negative (−) side input portion of the comparator 28.

To an output portion of the comparator 28, a gate of the transistor 30 composed of, for example, an N-channel MOS is connected. To one of connection portions of the transistor 30, the other one of the connection portions of the resistor 24 is connected. A connection portion between the transistor 30 and the resistor 24 is an output portion of the voltage stabilization circuit 3 and the internal power source voltage VDD is outputted.

And, to the other one of connection portions of the transistor, one of connection portions of the resistor 27 is connected. To the other one of the connection portions of the resistor 27, a reference potential VSS is connected.

The comparator 28 compares a voltage obtained by voltage-division of a primary voltage VCC by the resistors 24, and the resistor 26 with the reference voltage VREF1 of the reference power source unit 29 and outputs the comparison result. If the voltage obtained by voltage-division of the primary voltage VCC becomes higher than the reference voltage VREF1, the comparator 28 outputs a signal turning ON the transistor 30. By turning ON the transistor 30, a current of the primary voltage VCC is clamped via the resistor 27 and the stabilized internal power source voltage VDD is outputted.

To a connection portion of the transistor 30 and the resistor 27, a positive (+) side input portion of the comparator 31 is connected, and a negative (−) side input portion of the comparator 31 is connected so that a reference voltage VREF2 to be a comparison voltage generated by the reference power source unit 32 is inputted. To an output portion of the comparator 31, an input portion of the inverter 33 is connected.

And, a signal outputted from an output portion of the inverter 33 is a judgment result of the power intensity monitor unit 14 and connection is made so that the signal is inputted to one of input portions of the AND circuit 15.

Next, operation of the power intensity monitor unit 14 according to the present embodiment is explained.

A current clamped by the voltage stabilization circuit 3 is converted to a voltage by the resistor 27. The comparator 31 compares voltage levels of a voltage converted by the resistor 27 and the reference voltage VREF2 of the reference power source unit 32, and, for example, if the voltage level of the reference voltage VREF2 is lower, that is, if the distance between the semiconductor integrated circuit device 1 and the reader/writer is sufficiently short, a Lo signal is outputted as the judgment result of the power intensity monitor unit 14.

And, if the voltage level of the reference voltage VREF2 is higher, that is, if the distance between the semiconductor integrated circuit device 1 and the reader/writer is long to some extent, a Hi signal is outputted as the judgment result of the power intensity monitor unit 14. And, the judgment result outputted from the power intensity monitor unit 14 is inputted to one of input portions of the AND circuit 15.

The other operation in the communication distance limitation control circuit 8 is similar to that of the first embodiment (FIG. 3) and explanation thereof is omitted.

Thereby, also in the second embodiment, since the communication distance limitation can be performed by monitoring of a clamp current of the voltage stabilization circuit 3 by the communication distance limitation control circuit 8, the communication distance limitation can be performed with stable operation without lowering communication efficiency.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, a configuration in which the power intensity monitor unit 14 according to the first embodiment, shown in FIG. 2 and the voltage stabilization circuit 3 according to the second embodiment, shown in FIG. 4 are combined can be employed.

Figure 5:
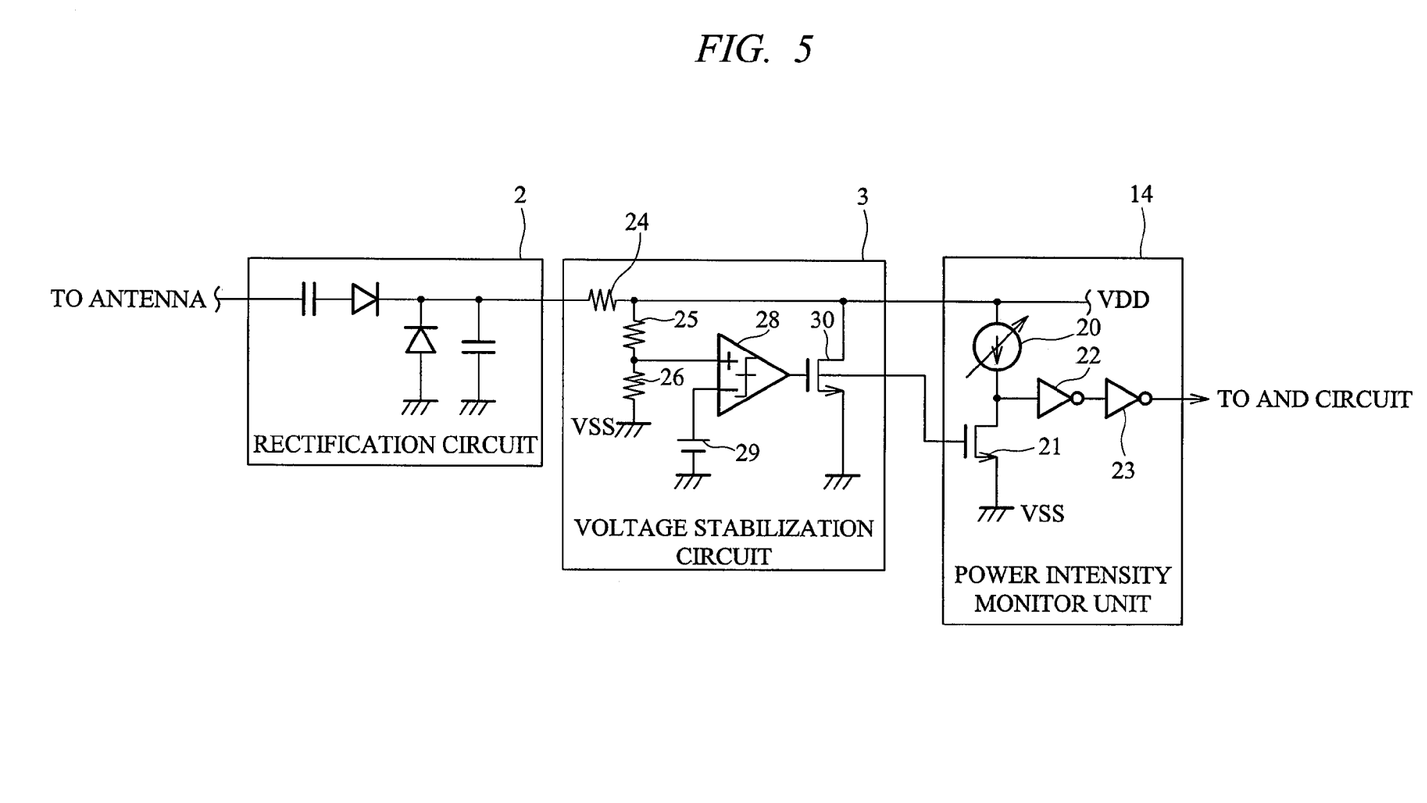
FIG. 5 is an explanatory diagram showing a configuration example of a voltage stabilization circuit and a power intensity monitor unit provided in a semiconductor integrated circuit device according to another embodiment of the present invention.

In this case, as shown in FIG. 5, the voltage stabilization circuit 3 comprises resistors 24 to 26, a comparator 28, a reference power source unit 29 and a transistor 30. The resistor 27 converting a current clamped by the transistor 30 to a voltage is unnecessary. And, the other connection configuration in the voltage stabilization circuit 30 is similar to that shown in FIG. 4.

Further, the power intensity monitor unit 14 comprises a constant current source 20, a transistor 21 and inverters 22, 23. This configuration differs from that in FIG. 2 in that connection is made so that the judgment result of the comparator 28 is inputted to a gate of the transistor 21. The other connection configuration in the communication distance limitation control circuit 8 is similar to that shown in FIG. 2.

And, in the abovementioned embodiments, a configuration in which the switch unit 16 (FIG. 1) is connected between the command demodulation circuit 4 and the command decode unit 9 is employed, however, a configuration in which the switch unit 16 is connected, for example, between the antenna and the command demodulation circuit 4 may be employed.

Further, in the abovementioned embodiments, a configuration in which the communication distance limitation control circuit 8 is provided separately from the logic circuit 7 is described, however, the communication distance limitation control circuit 8 may be provided within the logic circuit 7.

The present invention is suitable for a stable communication technique in an ID tag when a communication distance with a reader/writer is limited.

What is claimed is:

1. A semiconductor integrated circuit device used in an IC tag converting a radio wave received from a reader/writer to power and returning information to the reader/writer comprising:
   a rectification circuit receiving the radio wave outputted from the reader/writer, rectifying power caused by electromagnetic induction of the radio wave and generating a primary voltage;
   a voltage stabilization circuit stabilizing the primary voltage generated by the rectification circuit and generating an internal power source voltage;
   a command demodulation circuit demodulating a command added to the radio wave outputted from the reader/writer to a digital signal;
   a command decode unit decoding the command of the digital signal demodulated by the command demodulation circuit; and
   a communication distance limitation control circuit limiting a communication distance with the reader/writer, the communication distance limitation control circuit comprising:
      a communication distance setting unit storing communication distance limitation setting data for setting the limitation of the communication distance with the reader/writer; and
      a power intensity monitor unit monitoring power of the primary voltage generated by the rectification circuit and making a judgment as to whether or not the power of the primary voltage is greater than or equal to a predetermined field intensity,
   wherein the communication distance limitation control circuit performs control so that:
   (1) the command decode unit receives an input of the digital signal outputted from the command demodulation circuit by making a connection between the command demodulation circuit and the command decode unit conductive when the communication distance limitation setting data is not set in the communication distance setting unit,
   (2) the command decode unit receives the input of the digital signal outputted from the command demodulation circuit by making the connection between the command demodulation circuit and the command decode unit conductive when the communication distance limitation setting data is set in the communication distance setting unit and the power intensity monitor unit makes judgment that the power of the primary voltage is greater than or equal to the predetermined field intensity, and
   (3) the command decode unit receives no input of the digital signal outputted from the command demodulation circuit by making the connection between the command demodulation circuit and the command decode unit nonconductive when the communication distance limitation setting data is set in the communication distance setting unit and the power intensity monitor unit makes judgment that the power of the primary voltage is less than the predetermined field intensity.

2. The semiconductor integrated circuit device according to claim 1,
   wherein the power intensity monitor unit monitors the power of the primary voltage using a clamp current clamped when the voltage stabilization circuit generates the internal power source voltage.

3. The semiconductor integrated circuit device according to claim 1,
   wherein the power intensity monitor unit performs comparison between a clamp voltage obtained by converting a clamp current to a voltage and a comparison voltage and outputs a result of the comparison as a judgment result.

4. A semiconductor integrated circuit device including a rectification circuit connected to an external antenna, a command demodulation circuit and a back scatter circuit, comprising:
   a voltage stabilization circuit stabilizing a voltage of the rectification circuit and supplying power;
   a power intensity monitor unit detecting field intensity from an output voltage of the voltage stabilization circuit; and
   a logic circuit performing operation and outputting a result of the operation to the back scatter circuit and including a command decode unit receiving a signal from the command demodulation circuit,
   wherein the logic circuit comprises a state management unit making judgment whether a current state is in an ordinary communication or a distance limitation communication,
   wherein the logic circuit couples a signal path from the command demodulation circuit to the command decode unit when the state management unit makes judgment that the current state is in the ordinary communication,
   wherein the logic circuit couples the signal path from the command demodulation circuit to the command decode unit when the state management unit makes judgment that the current state is in the distance limitation communication and the field intensity detected by the power intensity monitor unit is greater than or equal to a predetermined field intensity, and
   wherein the logic circuit cuts off the signal path from the command demodulation circuit to the command decode unit when the state management unit makes judgment that the current state is in the distance limitation communication and the field intensity detected by the power intensity monitor unit is smaller than the predetermined field intensity.

5. The semiconductor integrated circuit device according to claim 4,
   wherein the state management unit comprises a register for setting communication distance limitation setting data for setting the limitation of the communication distance with the reader/writer;
   wherein the current state is in the ordinary communication when the communication distance limitation setting data is not set in the register,
   wherein the current state is in the distance limitation communication when the communication distance limitation setting data is set in the register.

6. The semiconductor integrated circuit device according to claim 4,
   wherein the power intensity monitor unit monitors power of a primary voltage generated by the rectification circuit and makes judgment whether the power of the primary voltage is the predetermined arbitrary field intensity or more.

7. The semiconductor integrated circuit device according to claim 6,
   wherein the power intensity monitor unit monitors the power of the primary voltage using a clamp current clamped when the voltage stabilization circuit generates an internal power source voltage.

8. The semiconductor integrated circuit device according to claim 6, wherein the power intensity monitor unit performs comparison between a clamp voltage obtained by converting a clamp current to a voltage and a comparison voltage and outputs a result of the comparison as a judgment result.

* * * * *